(12) United States Patent
Shida

(10) Patent No.: US 7,174,150 B2
(45) Date of Patent: Feb. 6, 2007

(54) METHOD FOR PROCESSING INFORMATION ASSOCIATED WITH DISASTER

(75) Inventor: Daiki Shida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 474 days.

(21) Appl. No.: 10/326,981

(22) Filed: Dec. 24, 2002

(65) Prior Publication Data
US 2003/0162557 A1    Aug. 28, 2003

(30) Foreign Application Priority Data
Feb. 25, 2002    (JP)    ............... 2002-048146

(51) Int. Cl.
*H04M 11/04*    (2006.01)
*H04Q 7/20*    (2006.01)

(52) U.S. Cl. ............... 455/404.1; 455/521; 455/404.2; 379/37

(58) Field of Classification Search ............ 455/404.1, 455/404.2, 456.1, 412.1, 456.2; 340/901, 340/287; 342/357.09; 379/37
See application file for complete search history.

(56) References Cited

U.S. PATENT DOCUMENTS

| | | | |
|---|---|---|---|
| 4,606,073 A * | 8/1986 | Moore | 455/90.1 |
| 5,146,611 A * | 9/1992 | Stolarczyk | 455/40 |
| 5,185,697 A * | 2/1993 | Jacobs et al. | 379/45 |
| 5,598,460 A * | 1/1997 | Tendler | 455/404.2 |
| 5,689,233 A * | 11/1997 | Kurisu et al. | 340/506 |
| 5,797,093 A * | 8/1998 | Houde | 455/404.1 |
| 6,198,914 B1 * | 3/2001 | Saegusa | 455/404.2 |
| 6,463,273 B1 * | 10/2002 | Day | 455/404.1 |
| 6,516,424 B2 * | 2/2003 | Satomi et al. | 714/4 |
| 6,917,797 B1 * | 7/2005 | Hoppa | 455/404.1 |
| 7,039,386 B2 * | 5/2006 | Kolsrud | 455/404.1 |

FOREIGN PATENT DOCUMENTS

JP    10-040484    2/1998

(Continued)

OTHER PUBLICATIONS

Japanese Office Action mailed Aug. 1, 2006 for Japanese Patent Application No. 2002-048146 (2 pgs).

*Primary Examiner*—Tilahun Gesesse
(74) *Attorney, Agent, or Firm*—Staas & Halsey LLP

(57) ABSTRACT

An object of this invention is to make it possible to confirm the safety of persons who have the possibility of encountering the damage of the disaster when the disaster occurred. This system receives information of the disaster occurring region A and information of subscribers in the disaster occurring region A, and stores it in the disaster region subscriber table storage unit. Then, it transmits the disaster notice to the subscriber terminal in the disaster occurring region A. When it receives information of the position of the subscriber terminal or a voluntary safety confirmation response from the subscriber terminal in the disaster occurring region A, it judges whether the subscriber is in the safe state, and stores the judgment result in the disaster region subscriber table storage unit 45. With this configuration, the occurrence of the disaster can be notified to the subscribers in the disaster occurring region A, and it becomes possible for each subscriber to judge whether he or she is in the safe state. Moreover, it may also transmit the aforementioned judgment result to the subscriber terminal as the transmission source.

30 Claims, 9 Drawing Sheets

FOREIGN PATENT DOCUMENTS

| | | |
|---|---|---|
| JP | 20001-011284 | 1/2000 |
| JP | 2000-040195 | 2/2000 |
| JP | 2000-099442 | 4/2000 |
| JP | 2000-106608 | 4/2000 |
| JP | 2000-201377 A | 7/2000 |
| JP | 2000-315980 | 11/2000 |
| JP | 2001-112066 | 4/2001 |
| JP | 2001-148083 | 5/2001 |
| JP | 2001-168990 A | 6/2001 |

* cited by examiner

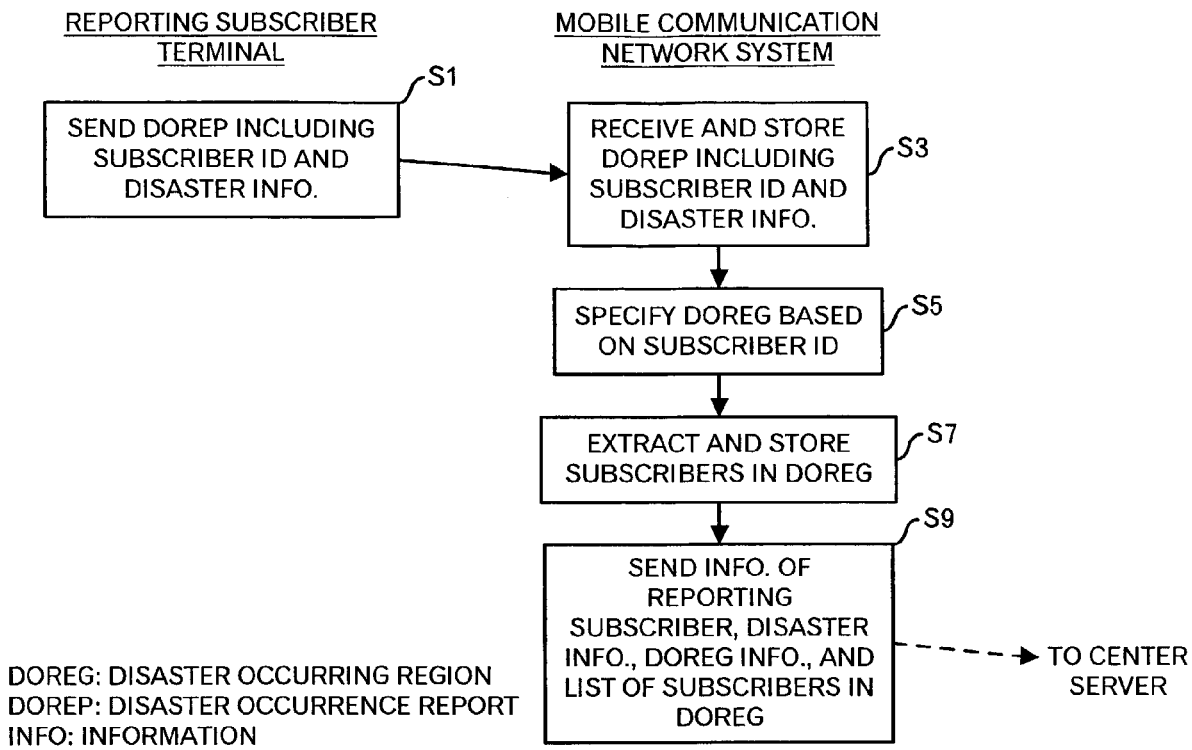

| REPORTING SUBSCRIBER ID | DISASTER OCCURRING REGION ID | SUBSCRIBER ID | CURRENT REGION ID | STATUS OF SAFETY CONFIRMATION |
|---|---|---|---|---|
| REPORTING SUBSCRIBER | REGION A | SUBSCRIBER A | REGION A | NOT YET |
| | | SUBSCRIBER B | REGION B | OK |
| | | SUBSCRIBER C | REGION A | NOT YET |
| | | SUBSCRIBER D | REGION D | OK |
| | | ⋮ | ⋮ | ⋮ |

DOREG: DISASTER OCCURRENCE REGION
INFO: INFORMATION

| REGION ID | MAP ID | REFUGE PLACE | REGION OF REFUGE PLACE |
|---|---|---|---|
| REGION A | MAP A | A1 ELEMENTARY SCHOOL | REGION C |
|  |  | A2 JUNIOR HIGH SCHOOL | REGION B |
|  |  | A3 PARK | REGION B |
|  |  | ⋮ | ⋮ |
| REGION B | MAP B | B1 PARK | REGION A |
|  |  | B2 SENIOR HIGH SCHOOL | REGION C |
|  |  | ⋮ | ⋮ |
| ⋮ | ⋮ | ⋮ | ⋮ |

| DISASTER OCCURRING REGION ID | REGION ID OF REFUGE PLACE | DANGEROUS REGION ID |
|---|---|---|
| REGION A | REGION A | REGION A |
|  | REGION C | REGION D |

INFO: INFORMATION
SC: SAFETY CONFIRMATION

METHOD FOR PROCESSING INFORMATION ASSOCIATED WITH DISASTER

TECHNICAL FIELD OF THE INVENTION

This invention relates to a safety confirmation technique when the disaster occurred.

BACKGROUND OF THE INVENTION

For instance, Japanese laid open patent application No. 2001-148083 indicates the following technology. That is, when an emergency rescuer key of a wireless terminal is pushed when an emergency has occurred, an emergency rescuer report signal is transmitted from the wireless terminal to a wireless base station with a unique ID to specify the owner of the terminal. The wireless base station transmits the emergency rescue report signal to the emergency contact center with a unique ID to specify the position of the base station. The emergency contact center calculates the place where the emergency has occurred from the base station ID, furthermore, calculates the address and name of the informant from the terminal ID, and then, returns them with the emergency rescuer instruction signal. In response to this, the wireless base station transmits the emergency rescue instruction signal as an information signal, and all wireless terminals that register their positions in the wireless base station can receive the emergency rescue instruction signal. A lot of vicinity residents can grasp the address and name of the informant at the same time by an easy operation by the informant, which is the push of the button. When the emergency has occurred in a specific person, such a system is useful. However, when the disaster occurred such as a fire, which influences even the residents in the vicinity, the safety of the residents in the vicinity cannot be confirmed.

For instance, Japanese laid open patent application No. 2000-315980 indicates the following technology. That is, in a case where a wireless system of the station notifies the station employees of information on an emergency report etc. by using a cellular phone and the like, the group for each station employee's charge area is registered in advance, and the information on the emergency report is broadcast to the station employees of the group. Then, the reply contents from a plurality of respondents for the broadcast information are displayed in a list manner on the portable terminal that carried out the notification. A respondent, who can correspond, is selected from the list, and the correspondence request is notified. Like this, the system that needs prior registration such as the group registration has the fault that the report is done even in case of being in the far-flung place from the region where the disaster happened. Moreover, there is a possibility to go to the dangerous place without knowing, if it is not informed in a case where it is not registered.

According to such a background arts, the system that notifies parties concerned of the occurrence of the emergency exists. However, the system that confirms the safety of people in the disaster occurring region is not shown. Moreover, the mechanism that the report is limited only to the person who has the possibility of really encountering the damage of the disaster is not indicated.

SUMMARY OF THE INVENTION

Therefore, an object of this invention is to provide a novel technique for enabling to confirm the safety of the persons who have the possibility of encountering the damage of the disaster when the disaster occurred.

According to a first aspect of this invention, a method of processing information associated with the disaster comprises the steps of: receiving information concerning a disaster occurring region and information of a user of this service (for instance, holders of the wireless transceivers such as cellular phones) in the disaster occurring region, and storing it in a storage device; transmitting a disaster notice to a terminal of the user of this service in the disaster occurring region; and judging whether the user of this service is in a safe state if information concerning the user of this service is received, and storing the judgment result in the storage device. With this configuration, the occurrence of the disaster can be notified to the users of this service in the disaster occurring region, and it is also possible to judge whether or not each user of this service is in the safe state.

Incidentally, the first aspect of this invention may further comprise a step of transmitting the judgment result in the aforementioned judging step to the terminal of the user of this service. With this configuration, the user of this service can also judge whether he or she has moved to a position away enough from the disaster occurring point, for instance.

Moreover, in the aforementioned judging step, if the information concerning the user of this service is position information, it may be judged whether the user of this service is in the safe region based on the position information. The information on the safety of the user of this service will be registered in a server only by the movement of the user.

In addition, in the aforementioned judging step, if the information concerning the user of this service is a safety response by the user of this service, it may be determined whether or not the user of this service is in the safe state based on the safety response. Thus, it may be determined whether he or she is in the safe state based on the direct safety response by the user of this service.

According to a second aspect of this invention, the method of processing information associated with the disaster comprises the steps of: receiving information of a disaster informant, information of the disaster report, and information of the disaster region from a server, and displaying it on a display device; and in response to an operator's instruction, transmitting a notification instruction for each user of this service in the disaster region to the server, wherein the notification instruction includes at least an instruction whether or not the safety confirmation is necessary. As described above, it can be judged whether the safety confirmation is necessary and/or the notification to the user of this service is necessary according to the scale and the state of the disaster in the police station, the fire station or the disaster rescue center, etc. Incidentally, it may be determined whether the safety confirmation is necessary based on not only the instruction by the operator but also another reference (for instance, the instruction of the disaster informant).

According to a third aspect of this invention, the method of processing information associated with the disaster comprises the steps of: if a disaster occurrence report is received from a subscriber terminal, specifying a disaster region including a region in which at least that subscriber terminal exists; specifying terminals of users of this service, who exist in the disaster region; transmitting information of the disaster occurrence report, information of the disaster region, and information of the terminals of the users of this service to a server; and if the change of the region in which the terminal of the user of this service exists is detected, transmitting at least information concerning the region after the change to the server. In a case where the disaster occurrence report is received, it is necessary to grasp and notify the movement of the user of this service who exists in the disaster region to the server until the safety of the user of this service is confirmed or during a predetermined period.

Incidentally, the aforementioned method can be carried out with the program and the computer, and for instance, this program is stored in storage media or storage device such as the flexible disk, CD-ROM, the magneto-optical disk, the semiconductor memories, or hard disk. Moreover, the program is likely to be distributed as a digital signal through the network etc. An intermediate processing result is temporarily held in the memory.

BRIEF DESCRIPTION OF THE DRAWINGS

FIG. 2 is a diagram showing a first portion of a processing flow in one embodiment of this invention;

FIG. 3 is a diagram showing one example of a regional subscriber table;

FIG. 4 is a diagram showing one example of a list table of subscribers who exist in the disaster occurring region;

FIG. 8 is a diagram showing one example of a regional map information table;

FIG. 9 is a diagram showing one example of a table for managing the dangerous region;

DETAIL DESCRIPTION OF THE PREFERRED EMBODIMENTS

Figure 1:
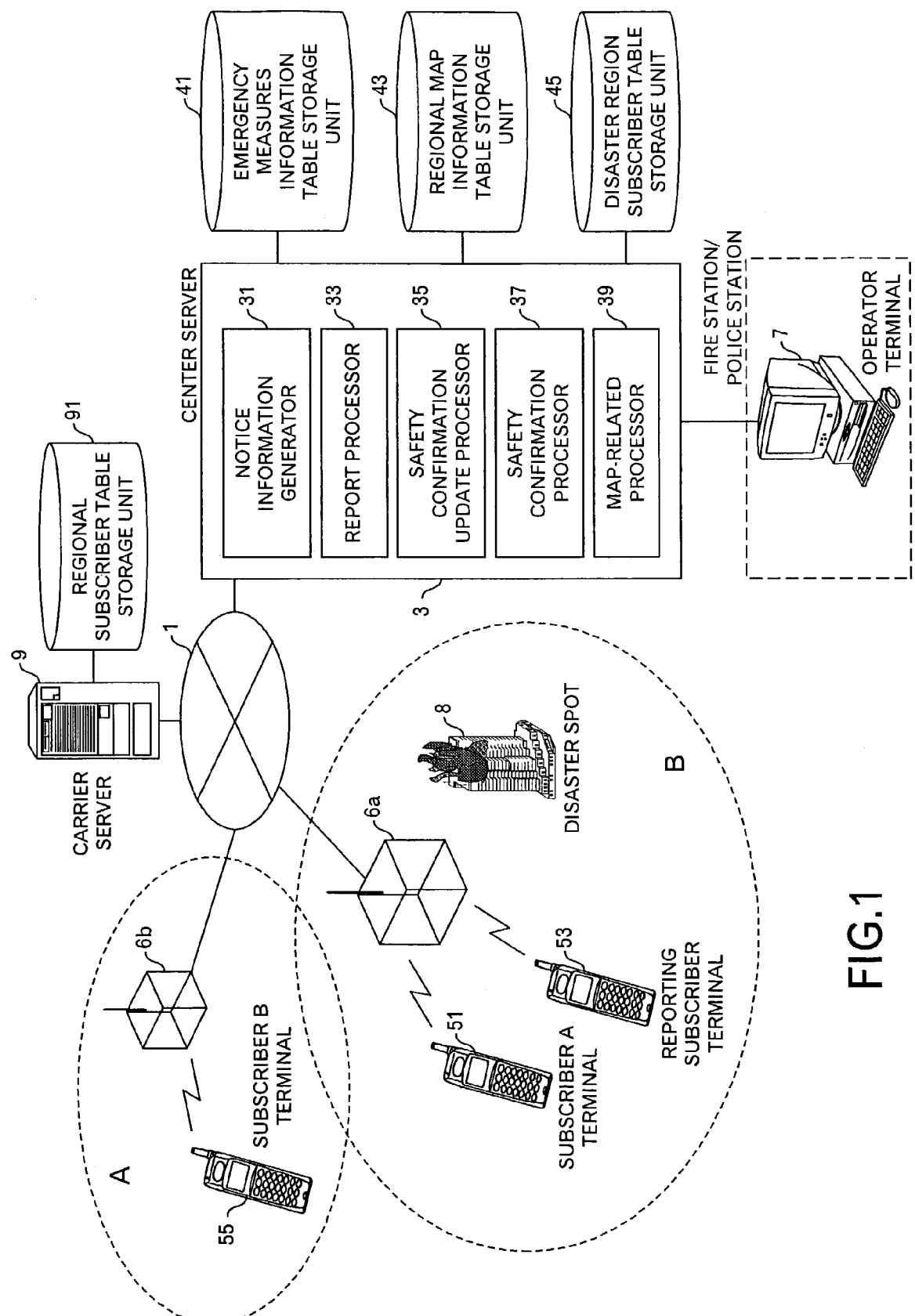
FIG. 1 is a diagram showing an example of a system configuration in one embodiment of this invention.

The system outline according to one embodiment of this invention will be explained by using FIG. 1. A base station 6a for a region A, base station 6b for a region B, a carrier server 9 that carries out a processing for this embodiment, and center server 3 that carries out a main processing for this embodiment are connected with network 1 that is a computer network such as the public network and/or the Internet, etc. In this example, a subscriber A terminal 51 and reporting subscriber terminal 53 exist in the region A, and when the disasters occurred, these terminals performs the wireless communication mainly with the base station 6a. The subscriber A terminal 51 is a cellular phone or PHS (Personal Handyphone System) equipment, which has a function for connecting to the network such as the Internet etc. and a web browser function, and is operated by a subscriber A. The reporting subscriber terminal 53 has a function similar to the subscriber A terminal 51 and is operated by the reporting subscriber who carries out the report of the occurrence of the disaster. Besides, the subscriber B terminal 55 that has a function similar to the subscriber A terminal 51 and are operated by a subscriber B exists in a region B. When the disaster occurred, the subscriber B terminal 55 carries out the wireless communication mainly with the base station 6b.

Incidentally, the method of the wireless communication is arbitrary, and for instance, the terminals carry out the wireless communication with two or more base stations, and the signal from the base station that receives the signal with the highest reliability may be finally adopted. Incidentally, a disaster spot 8 is assumed to exist in the region A in this example.

Though only two base stations are shown in the figure for the convenience of the explanation, it is assumed that a lot of base stations are provided. Besides, the system that includes the base station 6a, base station 6b, network 1, carrier server 9, and etc. and are managed and operated by the carrier will be called a mobile communication network system. Besides, the carrier server 9 may be a switch, router, or other communication equipment. The carrier server 9 has a regional subscriber table storage unit 91 for storing a regional subscriber table to manage information of a region where the subscriber exists.

The center server 3 has an emergency measures information table storage unit 41 for storing an emergency measures information table that is a table of information associated with the emergency measures, a regional map information table storage unit 43 for storing a regional map information table that is a table of map information on various places and information on a place of refuge etc., a disaster region subscriber table storage unit 45 for storing a disaster region subscriber table to manage safety information of subscribers who exist in the disaster occurring region. Besides, the center server 3 is connected to an operator terminal 7 provided in facilities such as fire stations and police stations, for instance, to plan and instruct measures against the disaster etc.

The center server 3 includes a notice information generator 31 that carries out a processing to generate and transmit a notice of the occurrence of the disaster, which includes information associated with the disaster, report processor 33 that processes the disaster occurrence report from the reporting person of the occurrence of the disaster, safety confirmation update processor 35 that manages the state of the safety of subscribers who exist in the disaster occurring region, safety confirmation processor 37 that transmits information on the state of the safety of subscribers who exist in the disaster occurring region to the operator terminal 7 according to the operator's inquiry request, map-related processor 39 that processes map information on the disaster occurring region to be provided to the operator terminal 7 and map information to be transmitted to terminals of the subscribers who exist in the disaster occurring region.

The processing of the system shown in FIG. 1 will be explained by using FIG. 2 to FIG. 14. First, the reporting subscriber inputs disaster information by operating the reporting subscriber terminal 53 when he or she discovered the occurrence of the disaster at the disaster spot 8.

For instance, he or she may input the voice, or the characters, and the image file taken by the digital camera or the video camera that was built into or connected with the reporting subscriber terminal 53 may be used as the disaster information. Incidentally, in this embodiment, the reporting subscriber can also carries out an instruction whether or not the safety confirmation of the subscribers who exist in the disaster occurring region should be carried out, and the disaster information includes this information representing whether or not this safety confirmation should be carried out. The reporting subscriber terminal 53 generates the disaster occurrence report including the input disaster information and own subscriber ID, and transmits it (step S1). The disaster occurrence report transmitted from the reporting subscriber terminal 53 is transmitted to the carrier server 9 of the mobile communication network system through the base station 6a of the disaster occurring region and the network 1. When the carrier server 9 receives the disaster occurrence report including the subscriber ID and disaster information from the reporting subscriber terminal 53, it temporarily stores the report in the storage device (step S3).

Then, the carrier server 9 retrieves the regional subscriber table stored in the regional subscriber table storage unit 91 by the received subscriber ID, and specifies the disaster occurring region (step S5).

It is assumed that the disaster occurring region is the region A in this example.

One example of the regional subscriber table is shown in FIG. 3. The example of FIG. 3 includes a column 201 of the subscriber ID and a column 202 of the existing region ID. Whenever the subscriber terminal changes its existing region, the carrier server 9 updates the regional subscriber table.

When the carrier server 9 specified the disaster occurring region, it retrieves the regional subscriber table by the disaster occurring region ID, and extracts the subscribers who exist in the disaster occurring region, and stores their information in the storage device (step S7). For instance, the list of the subscribers who exist in the disaster occurring region is held as shown in FIG. 4. Incidentally, though the subscriber A and the reporting subscriber are judged to be subscribers in the disaster occurring region in the example of FIG. 1, but the subscriber B is not listed because he or she is not in the disaster occurring region. Then, the carrier server 9 transmits information of the reporting subscriber (for example, the subscriber ID. However, the name and other information may be extracted separately.), disaster information included in the disaster occurrence report, information on the disaster occurring region, and list information of the subscribers in the disaster occurring region information to the center server 3 (step S9). The processing of FIG. 2 shifts to that of FIG. 5.

The report processor 33 of the center server 3 receives the information of the reporting subscriber, disaster information, information of the disaster occurring region, and list information of the subscribers in the disaster occurring region from the carrier server 9 of the mobile communication network system, and stores the data in the storage device (step S11). Then, the report processor 33 transmits the information of the reporting subscriber, disaster information, and information of the disaster occurring region to the operator terminal 7 in a predetermined form (step S13). The operator terminal 7 receives the information of the reporting subscriber, disaster information, and information of the disaster occurring region from the center server 3, and displays the data on the display device (step S15). With this configuration, the operator, who is using the operator terminal 7, becomes possible to know what disaster occurred. Incidentally, when the disaster information includes the voice information, the voice player of the operator terminal 7 may reproduce the voice in response to the operator's instruction. Moreover, when the disaster information etc. is received, the operator terminal 7 may output warning to the operator by the voice etc.

Figures 6, 7:
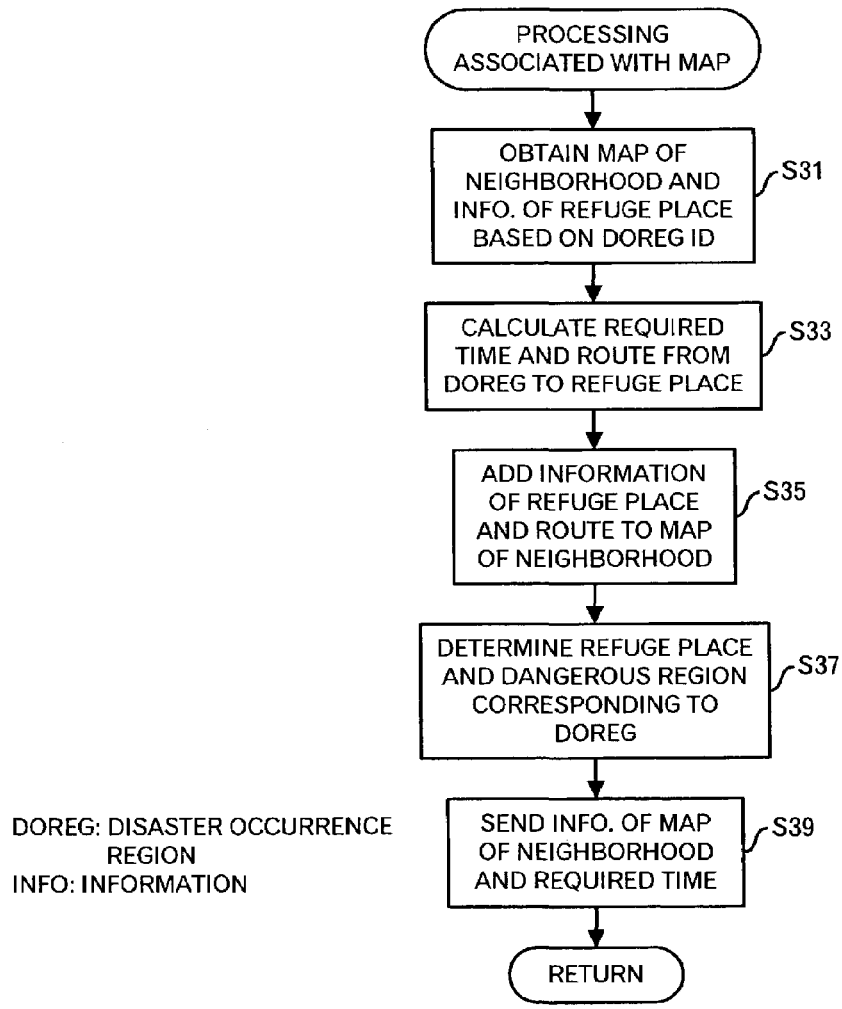
FIG. 6 is a diagram showing one example of a disaster region subscriber table.
FIG. 7 is a diagram showing a processing flow of a processing associated with a map.

Besides, the report processor 33 of the center server 3 generates the disaster regional subscriber table from the disaster occurring region ID and list information of the subscribers in the disaster occurring region, and stores it into the disaster region subscriber table storage unit 45 (step S17). One example of the disaster region subscriber table is shown in FIG. 6. The example of FIG. 6 includes a column 205 of the reporting subscriber ID, a column 206 of the disaster occurring region ID, a column 207 of the subscriber IDs of subscribers who exist in the disaster occurring region, a column 208 of the current subscriber existing region ID, a column 209 of the subscriber's safety confirmation status. The report processor 33 stores the information of the reporting subscriber, information of the disaster occurring region, and list information of the subscribers received in step S11 in each column. Besides, information ("Not yet" in the example of FIG. 6) representing unconfirmed is stored as an initial value in the column 209 of the safety confirmation status.

Moreover, the map-related processor 39 carries out a processing associated with the map, and transmits information concerning the disaster occurring region to the operator terminal 7 (step S19). This processing will be explained by using FIG. 7. Incidentally, after the step S11, the step S19 may be carried out in parallel with the step S13 and/or S17.

The map-related processor 39 retrieves the regional map information table stored in the regional map information table storage unit 43 by using the disaster occurring region ID, and obtains a map of the neighborhood and information of the place of refuge (step S31) One example of the regional map information table is shown in FIG. 8. The example of FIG. 8 includes a column 211 of the region ID, a column 212 of the map ID, a column 213 of the place of refuge, and a column 214 of the region including the place of refuge. For instance, when the disaster occurred in the region A, people take refuge to the place of refuge, such as the A1 elementary school, the A2 junior high school, and the A3 park. These places of refuge exist in the region C and the region B, and the region C and the region B are the safe regions. Incidentally, information of the map of the neighborhood is obtained by reading out a file or the like, which includes the map information by using the map ID.

Next, the map-related processor 39 calculates the standard required time and the route from the disaster occurring region to the place of refuge (step S33). This processing is similar to the usual technology for searching the shortest route, and since the distance is calculable if the route is obtained, the required time is calculable by dividing the distance by the assumed passing speed. The calculation result is stored in the storage device. Then, it adds information on the places of refuge and the route on the map of the neighborhood, and stores the map information in the storage device (step S35) Moreover, at this point, the information of the place of refuge and dangerous region is stored correspondingly to the disaster occurring region into the table as shown in FIG. 9, for example (step S37). The example of FIG. 9 includes a column 221 of the disaster occurring region ID, a column 222 of the region ID of the region including the place of refuge, and a column 223 of the dangerous region ID. The region ID of the region including the place of refuge can be obtained if the regional map information table is retrieved by using the disaster occurring region ID. The map-related processor 39 specifies the regions within a predetermined range from the disaster occurring region, for example, as the dangerous regions, and the specified region ID is stored as the dangerous region ID in the table of FIG. 9. However, the dangerous region may be determined for each region by separately taking into account geographical features and other elements, and may be stored into the regional map information table. Then, the map-related processor 39 transmits the map of the neighborhood, which is generated in the step S35, and information of the required time calculated in the step S33 to the operator terminal 7 (step S39).

With this configuration, the operator becomes easy to plan measures against the disaster because information of the state of the neighboring buildings, the position of the place of refuge, the route to the place of refuge and the like can be obtained.

Figure 5:
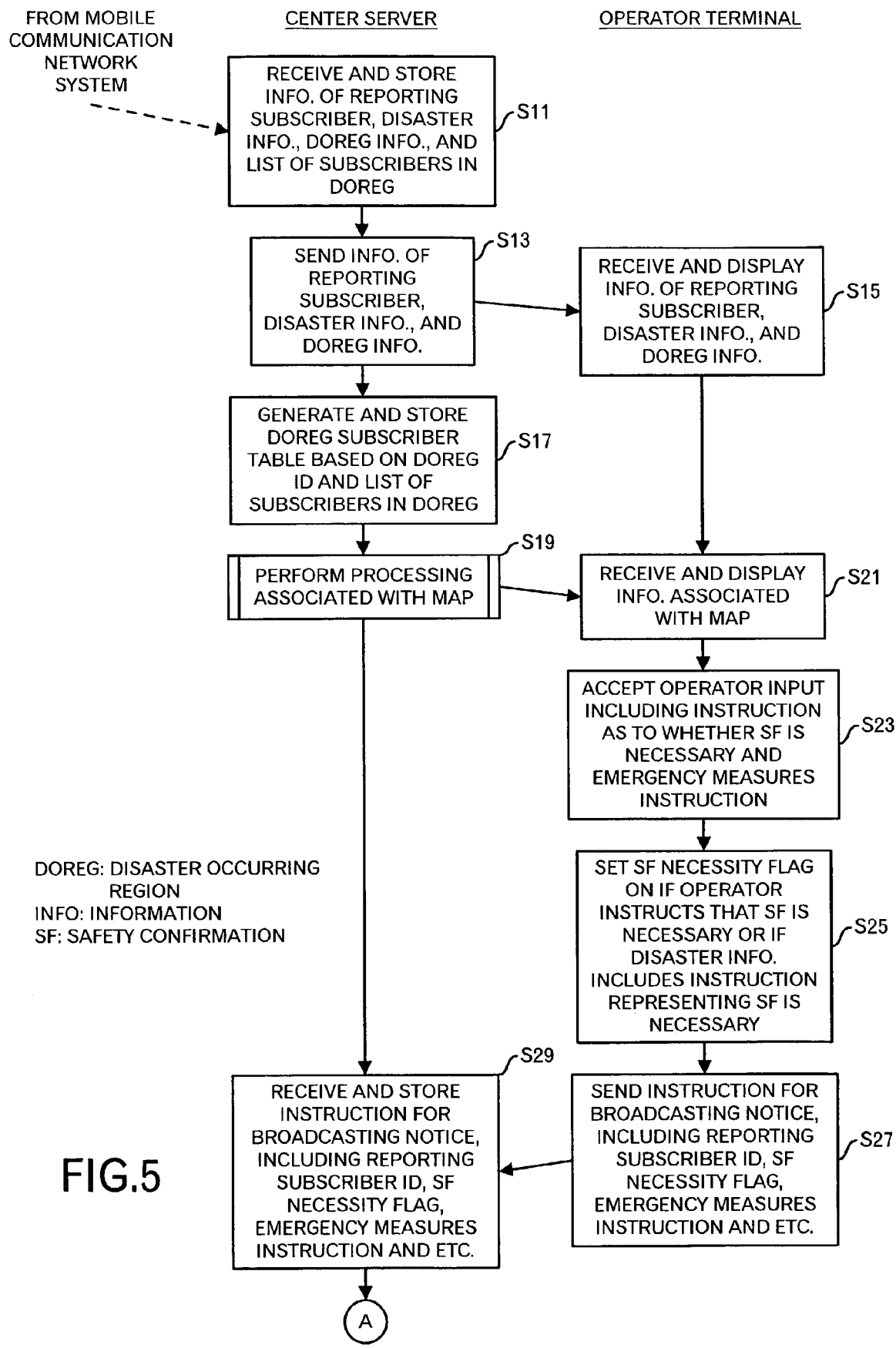
FIG. 5 is a diagram showing a second portion of the processing flow in one embodiment of this invention.

Returning to the explanation of FIG. 5, the operator terminal 7 receives the information of the map of the neighborhood, which includes the place of refuge and the route to it, and the information of the required time as the information associated with the map from the center server 3, and displays it on the display device (step S21). The operator judges whether to have to carry out the safety confirmation of the subscribers who exist in the disaster occurring region, based on the information displayed on the display device of the operator terminal 7, and inputs to the operator terminal 7, whether the safety confirmation is necessary or the safety confirmation is unnecessary. Besides, in a case where information of the injury person or the like is included in the disaster information, the operator inputs an emergency measures instruction to the operator terminal 7. The operator terminal 7 accepts the operator's input including an instruction as to whether or not the safety confirmation is necessary and an emergency measures instruction from the operator (step S23). Then, in a case where the operator instructs that the safety confirmation is necessary, or, in a case where the instruction that the safety confirmation is necessary is included in the disaster information, the operator terminal 7 sets the safety confirmation necessity flag "ON" (step S25). The initial value of the flag is "OFF". Then, the operator terminal 7 transmits an instruction for broadcasting a notice, which includes the reporting subscriber ID, safety confirmation necessity flag, and emergency measures instruction and the like, to the center server 3 (step S27). The instruction for broadcasting the notice further includes information to be notified such as the kind of the disaster and the degree of the emergency. Incidentally, according to circumstances, the operator may judge that there is no need to broadcast the notice to the subscribers in the disaster occurring region, without considering whether or not the safety confirmation is necessary, and may input no instruction.

Figures 10, 11:
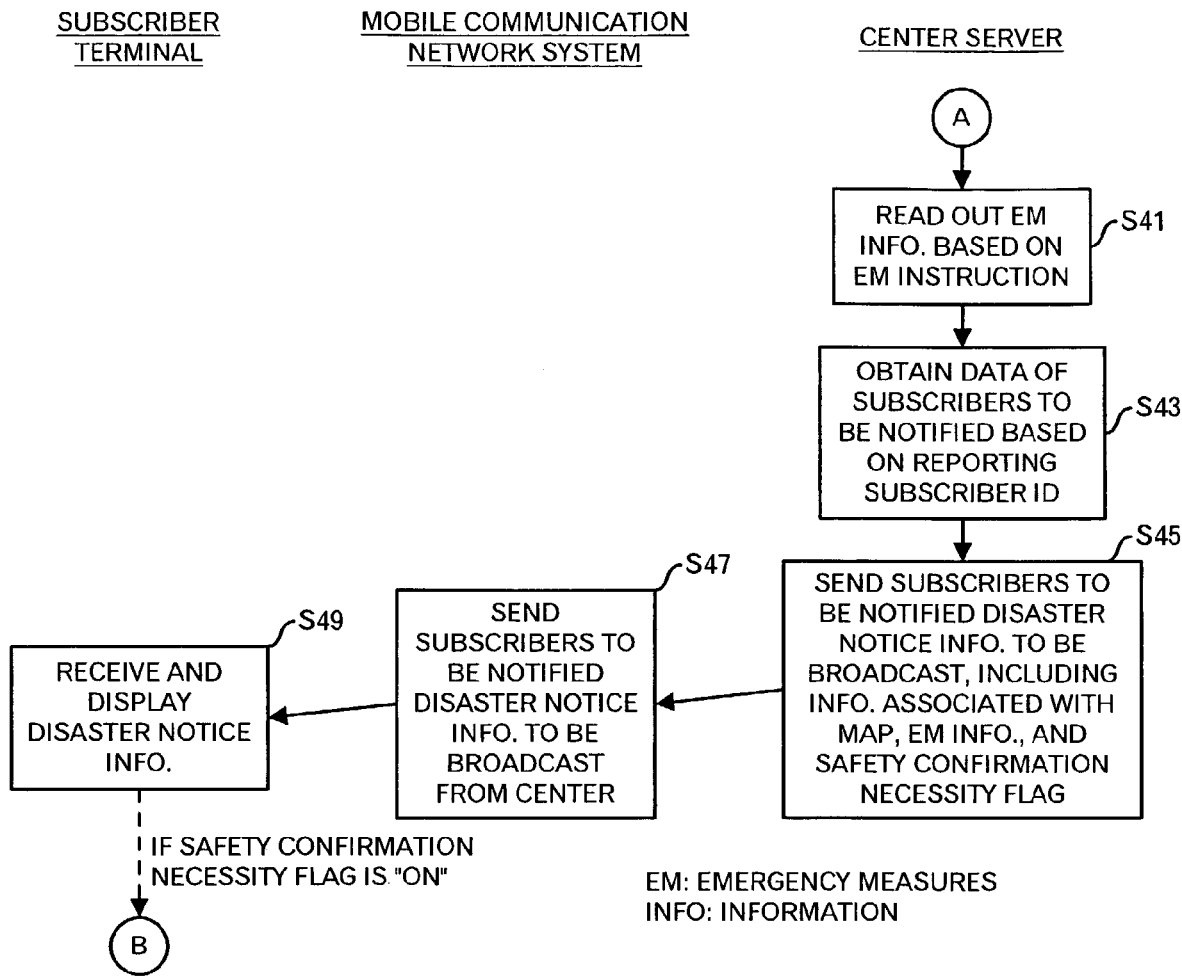
FIG. 10 is a diagram showing a third portion of the processing flow in one embodiment of this invention.
FIG. 11 is a diagram showing one example of an emergency measures information table.

The notice information generator 31 of the center server 3 receives the instruction for broadcasting the notice, which includes the reporting subscriber ID, safety confirmation necessity flag, the emergency measures instruction and the like, from the operator terminal 7, and temporarily stores into the storage device (step S29). Then, the processing shifts to FIG. 10 through a terminal A. The notice information generator 31 reads out the emergency measures information stored in the emergency measures information table storage unit 41 based on the emergency measures instruction (step S41 in FIG. 10). FIG. 11 shows one example of the emergency measures information table. The example of FIG. 11 includes a column 225 of the symptom and a column 226 of the emergency procedure. Like that, when the symptom is designated, information of the emergency procedure corresponding to the symptom can be obtained. Incidentally, the emergency measures information need not be read out if there is no instruction.

Besides, the notice information generator 31 retrieves the disaster region subscriber table stored in the disaster region subscriber table storage unit 45 by using the received reporting subscriber ID from the operator terminal 7. The notice information generator 31 acquires the data of the subscribers (subscribers to be notified) who should be informed of the occurred disaster (step S43). Concretely, the subscribers to be notified are subscribers who exist in the disaster occurring region. That is, the notice information generator 31 reads out the data of the column 207 of the subscriber ID in FIG. 6 corresponding to the reporting subscriber ID received from the operator terminal 7. Then, the notice information generator 31 generates notice information to be broadcast, which includes the information associated with the map as the processing result of the processing associated with the map (step S19), the emergency measures information obtained at the step S41, and the safety confirmation necessity flag, and transmits it to the subscribers to be notified, who are specified in the step S43. The notice information to be broadcast includes general information of this disaster such as the kind of disaster and the degree of the emergency. The mobile communication network system distributes the notice information to be broadcast from the center server 3 to the subscriber to be notified (step S47). The subscriber terminal of the designated subscriber receives the broadcast notice information from the mobile communication network system, and displays it on the display device (step S49).

Incidentally, for example, a short message or e-mail is used for the transmission to the subscriber terminals of the subscribers to be notified from the center server 3 in this embodiment. Besides, other methods of notifying information may be used. For instance, the center server 3 may call the subscriber terminals of the subscribers to be notified, tell only the point, and prompt that person to access a predetermined web server, and the web server may provide the disaster notice information to be broadcast. Moreover, the center server 3 may notify the point of the occurred disaster and the link to the above-described web server in the short message or E-mail, and may have the subscribers shift to the web server from the link. Furthermore, another method for directly notifying to each subscriber terminal may be adopted.

The steps up to the step S49 are processings carry out even if the safety confirmation necessity flag is even "OFF" or "ON". As a result, it becomes possible to transmit the disaster notice information to be broadcast, to the subscribers who seem to be influenced because they are around the disaster. Incidentally, it is also possible to narrow the subscribers to be notified further by another reference. Besides, though the above example pays attention only to the disaster occurring region, the carrier server 9 may extract not only the disaster occurring region but also the neighboring region, and may narrow the subscribers to those judged as being influenced later.

Next, a processing in a case where the safety confirmation necessity flag is ON will be explained by using FIG. 12 and FIG. 13. It is assumed that the subscriber terminal is the subscriber A terminal 51 here. The subscriber A terminal 51 judges whether the subscriber moved to another base station range (step S51). The subscriber A terminal 51 judges it from information of the beacon, which was sent by the base station and includes the region information. Incidentally, the subscriber A terminal 51 may judge whether the subscriber moved to not another base station but another base station group from a predetermined base station group. If it is judged that it moves to another base station range, the subscriber A terminal 51 transmits the positional switch request (it is also called the positional registration request) including the subscriber ID to the mobile communication network system (step S53). The processing shifts to step S69 after the step S51 in the subscriber A terminal 51. When the carrier server 9 of the mobile communication network system receives the positional switch request from the subscriber A terminal 51 (step S55), it retrieves the regional subscriber table in the regional subscriber table storage unit 91 by the subscriber ID, and registers the existing region ID after the movement correspondingly to the subscriber ID. Besides, the carrier server 9 retrieves the list of the subscribers who exist in the disaster occurring region (FIG. 4), judges whether or not the subscriber ID is included, and if the subscriber ID is included, transmits the subscriber ID and the subscriber position information (the existing region ID after the movement) to the center server 3 (step S57). In response to this, the safety confirmation update processor 35 of the center server 3 carries out the safety confirmation information updating processing (step S59). This processing will be described in detail later.

In a case where the subscriber A terminal 51 judged in the step S51 that the subscriber did not move to another base station range, it judges whether the safety confirmation response was input (step S61). The processing returns to the step S51 if the safety confirmation response is not inputted. On the other hand, if the safety confirmation response was input, the subscriber A terminal 51 accepts the input, and transmits the safety confirmation response (step S63). For instance, the subscriber pushes "Safety" button or "Rescue request" button displayed on the display device of the subscriber A terminal 51 according to the disaster notice information. Or, another button may be provided in the subscriber A terminal 51. The mobile communication network system forwards the safety confirmation response from the subscriber A terminal 51 to the center server 3 (step S65). When the safety confirmation response is received, the safety confirmation update processor 35 of the center server 3 carries out the safety confirmation information updating processing (step S59).

Figure 13:
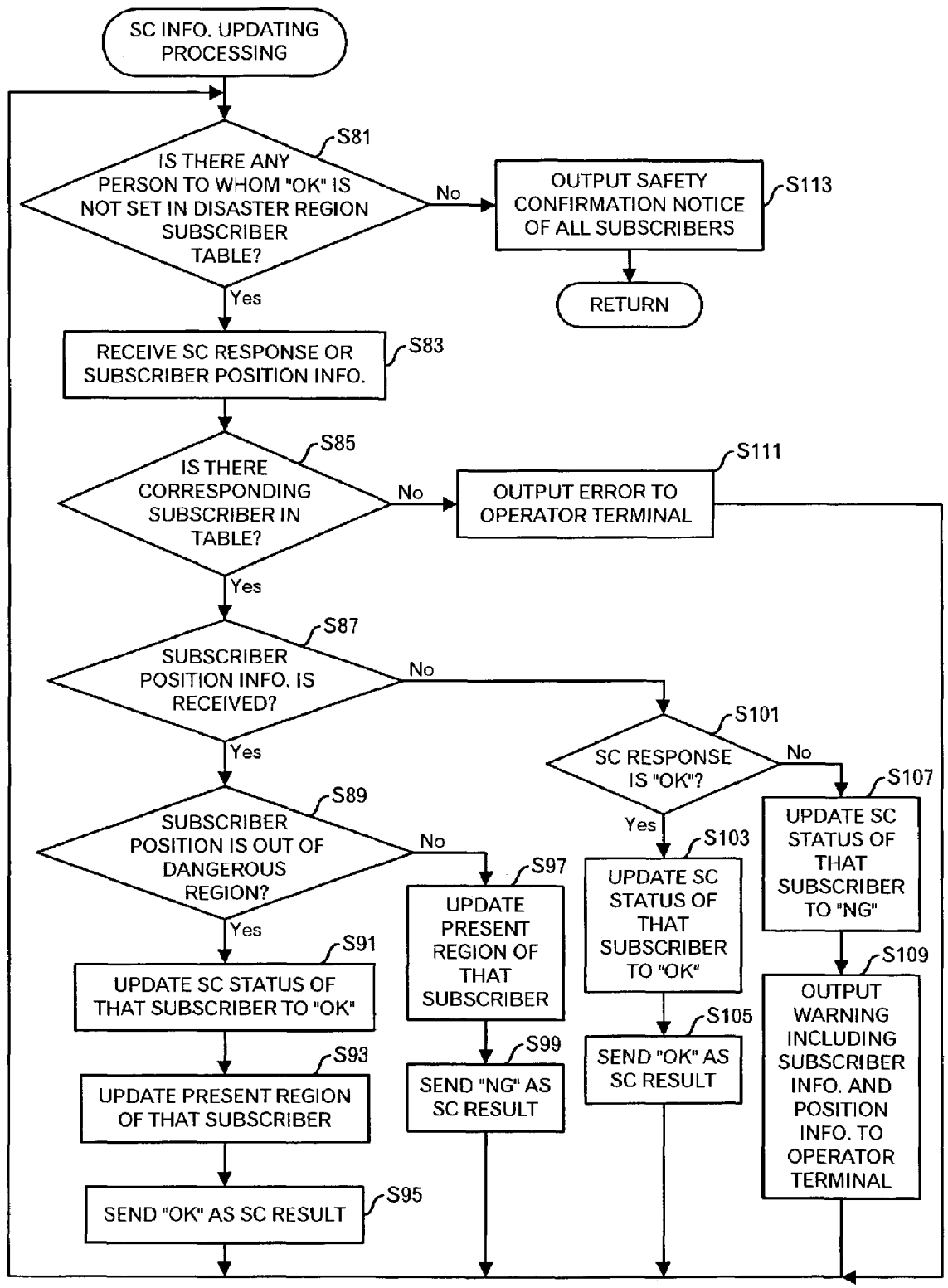
FIG. 13 is a diagram showing one example of a safety confirmation information updating processing.

Here, details of the safety confirmation information updating processing are explained by using FIG. 13. First, the safety confirmation update processor 35 judges whether the person whose safety confirmation status is not "OK" remains, by referring to the disaster region subscriber table (step S81). If the safety confirmation status for all persons is "OK", the safety confirmation update processor 35 transmits the safety confirmation notice about all subscribers to the operator terminal 7 (step S113). When the operator terminal 7 receives the safety confirmation notice about all subscribers, it displays the notice on the display device. As a result, the operator in the police station or the like can recognize that the safety confirmation of all subscribers was taken.

Besides, if the safety confirmation update processor 35 judges that any subscriber whose safety confirmation status is not "OK" such as the safety confirmation status is "not yet" or "NG" remains in the disaster region subscriber table, it waits for receiving the safety confirmation response from the subscriber terminal or the subscriber position information (the existing region ID after the movement) transmitted from the mobile communication network system (step S83). When the safety confirmation update processor 35 receives either of these, it retrieves the disaster region subscriber table based on the subscriber ID of the transmission source of the safety confirmation response or subscriber ID of the subscriber who moved, and judges whether or not the subscriber is registered in the disaster region subscriber table (step S85). If information concerning the subscriber not registered in the disaster region subscriber table is received, the safety confirmation update processor 35 outputs an error to the operator terminal 7 because it judges that some errors occurred (step S111).

On the other hand, if the received subscriber ID is registered in the disaster region subscriber table, the safety confirmation update processor 35 judges whether or not the subscriber position information was received in the step S83 (step S87). If the subscriber position information was received, the safety confirmation update processor 35 judges whether the subscriber is outside the dangerous region based on the subscriber position (the existing region after the movement) (step S89). For instance, information as to the dangerous region is obtained from the table of FIG. 9. Incidentally, information as to the safe region may be held reversibly, and the safety confirmation update processor 35 may judge whether the subscriber position is in the safe region. Besides, the safety confirmation update processor 35 may judge whether the subscriber has gone out of a predetermined range from the disaster occurring region in this step without maintaining the table like FIG. 9.

If the existing region after the movement is outside the dangerous region, the safety confirmation update processor 35 updates the safety confirmation status of that subscriber to "OK" in the disaster region subscriber table. Besides, the safety confirmation update processor 35 updates the region of the subscriber's present place with the received subscriber position in the disaster region subscriber table (step S93).

Furthermore, the safety confirmation update processor 35 transmits "OK" (a message to the effect that he or she is safe) to the subscriber terminal of that subscriber as a safety confirmation result (step S95).

On the other hand, if the subscriber position (the existing region after movement) is in the dangerous region, the safety confirmation update processor 35 updates the present position of that subscriber with the existing region after the movement in the disaster region subscriber table (step S97), and transmits "NG" (a message to the effect that that subscriber is in the dangerous region) to the subscriber terminal of that subscriber as a safety confirmation result (step S99).

If it is judged that the safety confirmation response was received in step S87, the safety confirmation update processor 35 judges whether the safety confirmation response is "OK" which means he or she is safe (step S101). If the safety confirmation response is the safe response, the safety confirmation update processor 35 updates the safety confirmation status of that subscriber to "OK" in the disaster region subscriber table (step S103), and transmits "OK" (a message of the safety confirmation completion) to the subscriber terminal of that subscriber as a safety confirmation result (step S105).

If the safety confirmation response from the subscriber terminal is "NG" which is a rescue request, the safety confirmation update processor 35 updates the safety confirmation status of that subscriber to "NG" in the disaster region subscriber table (step S107), and transmits warning including the subscriber's information (subscriber ID etc.) and the position information (the existing region information after the movement) to the operator terminal 7 (step S109). The operator terminal 7 displays it on the display device when the warning is received from center server 3. With this configuration, the rescue operation can be begun earlier, and it becomes possible to suppress human damage due to the disaster to the minimum.

Incidentally, the processing returns to the step S81 after the step S111, step S95, step S99, step S105, and step S109.

Figure 12:
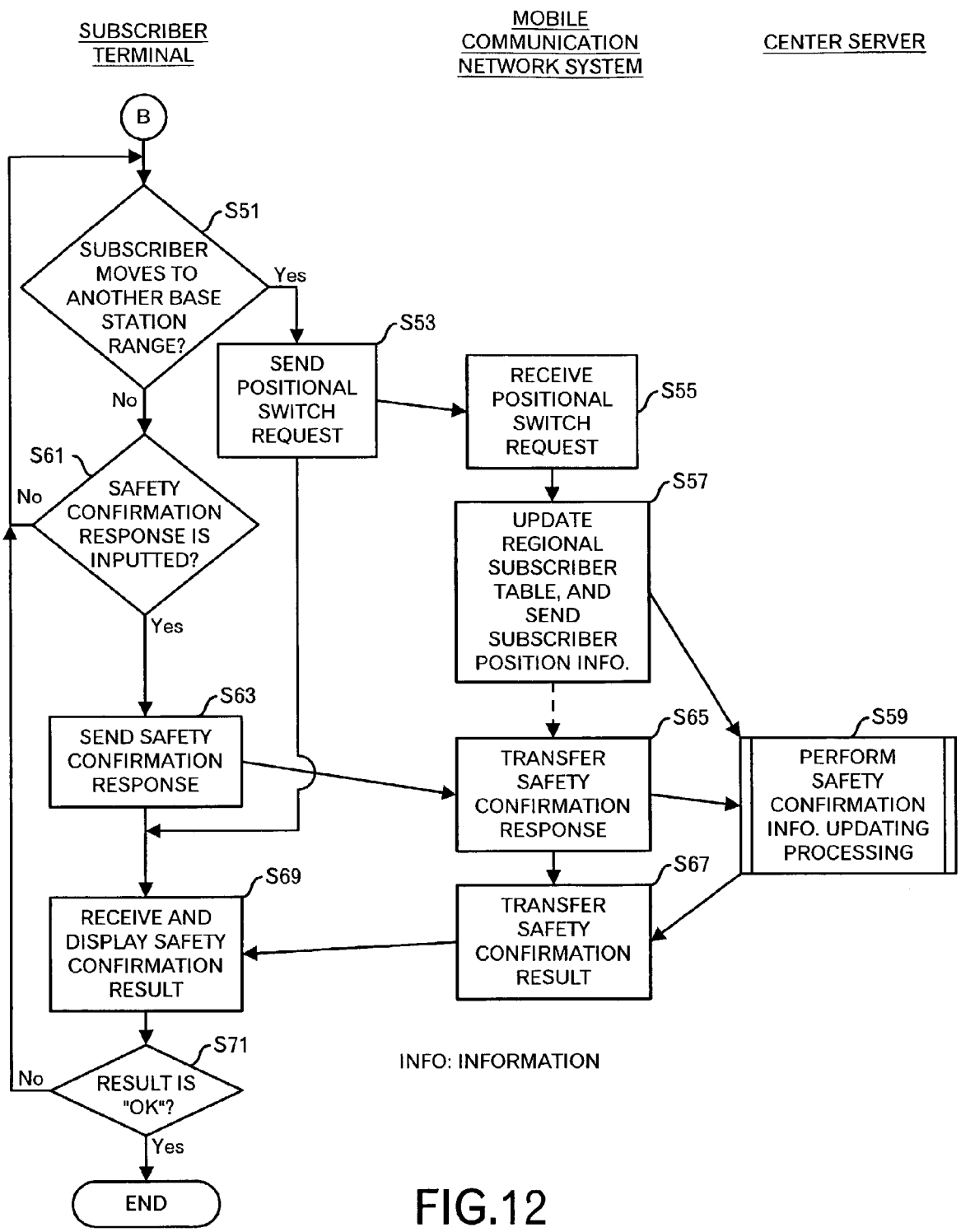
FIG. 12 is a diagram showing a fourth portion of the processing flow in one embodiment of this invention.

As describer above, since the safety confirmation update processor 35 of the center server 3 transmits the safety confirmation result (according to circumstances, it is an error message) to the subscriber terminal, the mobile communication network system forwards the safety confirmation result to the subscriber terminal (step S67 in FIG. 12). The subscriber terminal (the subscriber A terminal 51, here) receives the safety confirmation result, and displays it on the display device (step S69). For instance, it might be a message "Moved to the safe area", "Safety was confirmed", or "It is still in the vicinity of the region of the disaster. Please take refuge at once".

If the safety confirmation result is "OK", the subscriber A terminal 51 ends the processing. On the other hand, the processing returns to the step S51 if the safety confirmation result is "NG".

By carrying out such a processing, the center server 3 can carry out the safety confirmation of the subscribers who exist in the disaster occurring region by not only the subscriber's voluntary response but also an indirect response of the refuge by the subscriber. Moreover, because the result of the safety confirmation can be transmitted to each subscriber, even if he or she is in a strange place, the subscriber can obtain accurate information whether or not he or she was able to move to the safe place by the response from the center server 3.

Figure 14:
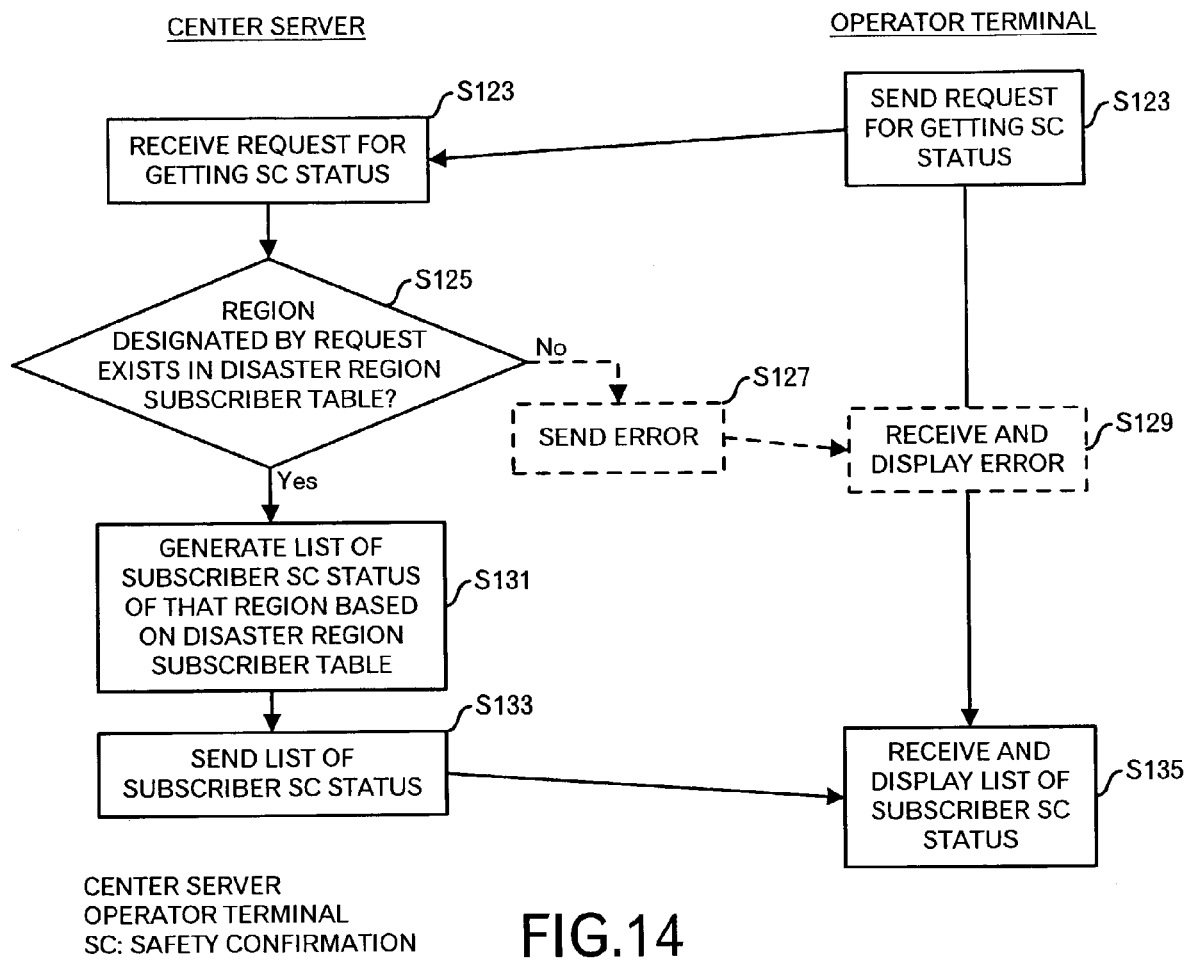
FIG. 14 is a diagram showing a fifth portion of the processing flow in one embodiment of this invention.

Next, a processing in a case where the operator, who operates the operator terminal 7, instructs to confirm the safety confirmation status is explained by using FIG. 14. The operator instructs the operator terminal 7 to obtain information of the safety confirmation status by specifying a specific disaster occurring region. In response to that instruction, the operator terminal 7 transmits a request for getting the safety confirmation status, with a regional ID, to the center server 3 (step S121). The safety confirmation processor 37 of the center server 3 receives the request for getting the safety confirmation status from the operator terminal 7 (step S123), and refers to the disaster region subscriber table to judge whether the region specified by the request for getting the safety confirmation status is included in the table (step S125). If a specified region ID is not registered in the disaster region subscriber table as a disaster occurring region ID, because it is an illegal request, the safety confirmation processor 37 transmits an error message to the operator terminal 7 (step S127). The operator terminal 7 receives the error message, and displays it on the display device (step S129). On the other hand, if the specified region ID is registered in the disaster region subscriber table as the disaster occurring region ID, the safety confirmation processor 37 extracts each subscriber ID to which that specified region ID is registered as the disaster occurring region ID and information of the safety confirmation status of that subscriber from the disaster subscriber table, and generates the subscriber safety confirmation status list (step S131). That is, the safety confirmation processor 37 extracts information in the column 207 of the subscriber ID and the column 209 of the safety confirmation status in FIG. 6. Incidentally, the safety confirmation processor 37 may also extract information in the column 208 of the current region ID at the same time. Then, the safety confirmation processor 37 transmits the subscriber safety confirmation status list to the operator terminal 7 (step S133). In response to this, the operator terminal 7 receives the subscriber safety confirmation list from the center server 3, and displays it on the display device (step S135).

With this configuration, it becomes possible for the operator to understand the current state, and to instruct more appropriate measures.

Although one embodiment of this invention is explained above, this invention is not limited to this embodiment. For instance, though the example with only one center server 3 was shown, it is possible to provide plural servers for each predetermined area. Besides, plural computers may realize the aforementioned functions of the center server 3. Furthermore, the function block configuration of the center server 3 is one example, and it may not be matched with an actual program module configuration. Besides, if two or more carriers exist, the content of the communication might have to be changed according to the interface that the carrier offers. Though only one operator terminal 7 is shown in FIG. 1, plural operator terminals may be provided.

Furthermore, although in the above example, it is explained that the reporting subscriber also judges whether the safety confirmation is necessary, and the operator instructs the safety confirmation processing according to the judgment, only the operator may judge whether the safety confirmation is necessary.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A method for processing information associated with a disaster, said method comprising:
   receiving information concerning a disaster occurring region and information of a plurality of users, wherein said plurality of users are extracted based on said information concerning said disaster occurring region;
   transmitting a disaster notice to terminals of said plurality users in said disaster occurring region;
   receiving information concerning a specific user of said plurality of users to whom said disaster notice was transmitted, and
   judging whether said specific user of said plurality of users is in a safe state based on the received information concerning said specific user.

2. The method as set forth in claim 1, further comprising transmitting the judgment result in said judging to said terminal of said specific user.

3. The method as set forth in claim 1, wherein in said judging, said received information concerning said specific user is position information, and it is judged whether said specific user is in a safe region based on said position information.

4. The method as set forth in claim 1, wherein in said judging, said received information concerning said specific user is a safety response by said specific user, and it is determined whether or not said specific user is in a safe state based on said safety response.

5. The method as set forth in claim 4, further comprising transmitting an operator terminal warning information, and
   wherein said safety response by said specific user is a rescue request.

6. The method as set forth in claim 1, wherein said disaster notice includes information of a place of refuge in said disaster occurring region.

7. The method as set forth in claim 1, wherein said disaster notice includes information concerning emergency measures.

8. The method as set forth in claim 1, further comprising including information representing execution of safety confirmation into said disaster notice,
wherein said judging is carried out according to said information representing execution of safety confirmation included in said disaster notice.

9. A method for processing information associated with a disaster, said method comprising:
receiving and displaying on a display device, information of a disaster informant, information of a disaster report, and information of a disaster region from a server; and
in response to an operator's instruction, transmitting a notification instruction for a plurality of users to said server, said notification instruction including at least an instruction whether or not the safety confirmation is necessary, and
wherein said plurality of users are extracted based on said information of said disaster region.

10. A method for processing information associated with a disaster, said method comprising:
receiving a disaster occurrence report from a subscriber terminal;
specifying a disaster region including a region in which at least said subscriber terminal exists;
extracting information of a plurality of users existing in said disaster region;
transmitting information of said disaster occurrence report, information of said disaster region, and information of the terminals of said plurality of users to a server; detecting a change of the region in which said terminal of one of said plurality of users exists;
transmitting at least information concerning said region after the change to said server.

11. An apparatus for processing information associated with a disaster, comprising:
a receiver that receives information concerning a disaster occurring region and information of a plurality of users, wherein said plurality of users are extracted based on said information concerning said disaster occurring region;
a transmitter that transmits a disaster notice to terminals of said plurality of users in said disaster occurring region;
a receiver that receives information concerning a specific user of said plurality of users to whom said disaster notice was transmitted, and
a processor that judges whether said specific user of said plurality of users is in a safe state based on the received information concerning said specific user.

12. The apparatus as set forth in claim 11, wherein said transmitter transmits the judgment result by said processor to said terminal of said specific user.

13. The apparatus as set forth in claim 11, wherein said received information concerning said specific user is position information, and said processor judges whether said specific user is in a safe region based on said position information.

14. The apparatus as set forth in claim 11, wherein said received information concerning said specific user is a safety response by said specific user, and said processor determines whether or not said specific user is in a safe state based on said safety response.

15. The apparatus as set forth in claim 14, wherein said transmitter transmits an operator terminal warning information, and
wherein said safety response by said specific user is a rescue request.

16. The apparatus as set forth in claim 11, wherein said disaster notice includes information of a place of refuge in said disaster occurring region.

17. The apparatus as set forth in claim 11, wherein said disaster notice includes information concerning emergency measures.

18. The apparatus as set forth in claim 11, further comprising a unit that includes information representing execution of safety confirmation into said disaster notice,
wherein, said processor operates out according to said information representing execution of safety confirmation included in said disaster notice.

19. An apparatus for processing information associated with a disaster, comprising:
a receiver that receives and displays on a display device, information of a disaster informant, information of a disaster report, and information of a disaster region from a server; and
a transmitter that, in response to an operator's instruction, transmits a notification instruction for a plurality of users to said server, said notification instruction including at least an instruction whether or not the safety confirmation is necessary, and
wherein said plurality of users are extracted based on said information of said disaster region.

20. An apparatus for processing information associated with a disaster, comprising:
a unit that receives a disaster occurrence report from a subscriber terminal;
a unit that specifies, a disaster region including a region in which at least said subscriber terminal exists;
a unit that extracts information of a plurality of users existing in said disaster region;
a unit that transmits information of said disaster occurrence report, information of said disaster region, and information of the terminals of said plurality of users to a server;
a unit that detects a change of the region in which said terminal of one of said plurality of users exists; and
a unit that transmits at least information concerning said region after the change to said server.

21. A program embodied on a medium for causing a computer to process information associated with a disaster, said program comprising:
receiving information concerning a disaster occurring region and information of a plurality of users, wherein said plurality of users are extracted based on said information concerning said disaster occurring region;
transmitting a disaster notice to terminals of said plurality of users in said disaster occurring region;
judging whether said specific user of said plurality of users is in a safe state based on the received information concerning said specific user.

22. The program as set forth in claim 21, further comprising transmitting the judgment result in said judging to said terminal of said specific user.

23. The program as set forth in claim 21, wherein in said judging, said received information concerning said specific user is position information, and it is judged whether said specific user is in a safe region based on said position information.

24. The program as set forth in claim 21, wherein in said judging, said received information concerning said specific user is a safety response by said specific user, and it is determined whether or not said specific user is in a safe state based on said safety response.

25. The program as set forth in claim 24, further comprising transmitting an operator terminal warning information, and wherein said safety response by said specific user is a rescue request.

26. The program as set forth in claim 21, wherein said disaster notice includes information of a place of refuge in said disaster occurring region.

27. The program as set forth in claim 21, wherein said disaster notice includes information concerning emergency measures.

28. The program as set forth in claim 21, further comprising including information representing execution of safety confirmation into said disaster notice,
   wherein, said judging is carried out according to said information representing execution of safety confirmation included in said disaster notice.

29. A program embodied on a medium for causing a computer to process information associated with a disaster, said program comprising:
   receiving and displaying on a display device, information of a disaster informant, information of a disaster report, and information of a disaster region from a server; and
   in response to an operator's instruction, transmitting a notification instruction for a plurality of users to said server, said notification instruction including at least an instruction whether or not the safety confirmation is necessary, and
   wherein said plurality of users are extracted based on said information of said disaster region.

30. A program embodied on a medium for causing a computer to process information associated with a disaster, said program comprising:
   receiving a disaster occurrence report from a subscriber terminal;
   specifying a disaster region including a region in which at least said subscriber terminal exists;
   extracting information of a plurality of users existing in said disaster region;
   transmitting information of said disaster occurrence report, information of said disaster region, and information of the terminals of said plurality of users to a server;
   detecting a change of the region in which said terminal of one of said plurality of users exists;
   transmitting at least information concerning said region after the change to said server.

* * * * *

UNITED STATES PATENT AND TRADEMARK OFFICE
CERTIFICATE OF CORRECTION

| | | |
|---|---|---|
| PATENT NO. | : 7,174,150 B2 | Page 1 of 1 |
| APPLICATION NO. | : 10/326981 | |
| DATED | : February 6, 2007 | |
| INVENTOR(S) | : Daiki Shida | |

It is certified that error appears in the above-identified patent and that said Letters Patent is hereby corrected as shown below:

On the Title Page, item [54] (Title), Line 1, change "METHOD FOR PROCESSING INFORMATION ASSOCIATED WITH DISASTER" to --METHOD, APPARATUS, AND COMPUTER PROCESSING PROGRAM FOR PROCESSING INFORMATION ASSOCIATED WITH DISASTER--.

Column 1 (Title), Line 1, change "METHOD FOR PROCESSING INFORMATION ASSOCIATED WITH DISASTER" to --METHOD, APPARATUS, AND COMPUTER PROCESSING PROGRAM FOR PROCESSING INFORMATION ASSOCIATED WITH DISASTER--.

Column 12, Line 37 (Claim 1, Line 8), insert --of-- before "users".

Column 12, Line 40 (Claim 1, Line 11), change "transmitted," to --transmitted;--.

Signed and Sealed this

Sixteenth Day of February, 2010

David J. Kappos
*Director of the United States Patent and Trademark Office*